United States Patent
Lyon

(12) 
(10) Patent No.: US 6,459,015 B1
(45) Date of Patent: Oct. 1, 2002

(54) DISPOSABLE ABSORBENT ARTICLES FOR HORSE OR PONY

(75) Inventor: Marie-Françoise Lyon, Aix-en-Provence (FR)

(73) Assignee: Sweet Horse International, Aix-en-Provence (FR)

( * ) Notice: Subject to any disclaimer, the term of this patent is extended or adjusted under 35 U.S.C. 154(b) by 0 days.

(21) Appl. No.: 09/068,950

(22) PCT Filed: Nov. 22, 1996

(86) PCT No.: PCT/FR96/01835

§ 371 (c)(1),
(2), (4) Date: May 21, 1998

(87) PCT Pub. No.: WO97/19017

PCT Pub. Date: May 29, 1997

(30) Foreign Application Priority Data

Nov. 22, 1995 (FR) ............................................. 95 14271

(51) Int. Cl.[7] ................................................. A61F 13/15
(52) U.S. Cl. ................... 604/368; 604/378; 604/385.03
(58) Field of Search ............................ 604/368, 385.1, 604/385.2, 378, 385.03, 385.05; 54/79.3, 79.4, 79.1, 66, 44.1; 119/854, 850

(56) References Cited

U.S. PATENT DOCUMENTS

| 4,341,216 A | * | 7/1982 | Obenour | 128/287 |
|---|---|---|---|---|
| 4,527,991 A | * | 7/1985 | Msarsa | 604/399 |
| 4,695,496 A | * | 9/1987 | Lee | 428/95 |
| 4,800,677 A | * | 1/1989 | Mack | 119/1 |
| 4,813,949 A | * | 3/1989 | O'Rourke | 604/391 |
| 4,857,065 A | * | 8/1989 | Seal | 604/368 |
| 5,005,525 A | * | 4/1991 | Stanton | 119/95 |
| 5,141,794 A | * | 8/1992 | Arroyo | 428/138 |
| 5,234,421 A | * | 8/1993 | Lowman | 604/385.1 |
| 5,422,169 A | * | 6/1995 | Roe | 428/212 |
| 5,555,847 A | * | 9/1996 | Kelly | 119/850 |
| 5,575,785 A | * | 11/1996 | Gryskiewicz et al. | 604/385.2 |
| 5,593,401 A | * | 1/1997 | Sosalla et al. | 604/385.28 |
| 5,605,735 A | * | 2/1997 | Zehner et al. | 428/100 |
| 5,662,640 A | * | 9/1997 | Daniels | 604/392 |

FOREIGN PATENT DOCUMENTS

| GB | 1347797 | * | 2/1974 | 604/368 |

* cited by examiner

*Primary Examiner*—John G. Weiss
*Assistant Examiner*—Jamisue Webb
(74) *Attorney, Agent, or Firm*—Millen, White, Zelano & Branigan, P.C.

(57) ABSTRACT

This invention consists of a disposable, absorbent article which absorbs animal perspiration. The article is characterized by the following features: an absorbent layer, and at least one reinforcing layer in order to insure article strength during use. Preferably, the absorbent layer is a flat layer having at least one superabsorbent material and either a non-woven fabric or at least one pad of fibers, and has an absorption capacity of at least 150 g of perspiration per $m^2$ of the absorbent layer. Preferably, the at least one reinforcing layer is at least a pair of gas-permeable reinforcing layers respectively bound to each side of the absorbent layer, and the at least one reinforcing layer is made of a microperforated film or a non-woven fabric. Preferably, each layer of the article is liquid permeable.

36 Claims, No Drawings

DISPOSABLE ABSORBENT ARTICLES FOR HORSE OR PONY

The present invention is about disposable and perspiration absorbent articles. These articles are more particularly intended to absorb animal perspiration, and may be in particular:

BACKGROUND OF THE INVENTION saddle pads to separate the saddle or inserted saddle clothes from perspiration, and to protect the animal, a horse or a pony, from saddle chafing.

clothes or numbered cloth used to identified racing dogs or harnessed horses in competitions, such as draught horses;

strap sheaths for horses and dogs.

sheaths for various harnessing components.

covers for components or shock absorbing cushions, placed underneath a saddle, and intended to relieve the back of a ridden horse.

back protecting pads for training, intended to protect the animal from saddle chafing and to cover its back by absorbing its perspiration and by separating the back from cold air.

anti-perspiration covers for animals to absorb perspiration after vigorous exercise and to protect them from cold drafts.

Normally saddles are isolated from the back of a perspiring horse by a simple rectangular cloth called a "saddle blanket" or by a thicker sheepskin saddle cloth or a felt or quilted fabric or even by a thick, folded wool blanket.

These saddle clothes have numerous disadvantages which often appear simultaneously:

(a) maintenance problems: saddle clothes have to be washed frequently and after every ride in order to eliminate hair and perspiration which might cause chafing inflammation through drying. Moreover, the thickness of the cloth can make washing difficult, and drying may be time consuming. Finally, this maintenance results in washing expenses and requires mobilizing a staff to achieve it.

(b) wear problems: clothes deteriorate from perspiration when they are not regularly washed, or by detergents when they are regularly washed, so they get quickly worn out. Accordingly, the wearability of clothes isolated by contact with perspiration emanating from an animal such as a horse. Furthermore, the saddle gets wet, is made dirty, or spoiled, this problem being even increased through shocks and pressures caused by the weight and the position of the rider.

(c) hygiene problems: skin diseases such as ringworm, or scabs or other parasites, can often be spread when a used cloth is transferred, without being washed, from one animal to another.

Consequently:

animals are not well protected and often are prone to injuries caused by saddle chafing;

there is an important risk of skin disease propagation;

the saddle is poorly protected from animal perspiration which causes deterioration of the leather.

To find a remedy to these unpleasant drawbacks, U.S. Pat. No. 3,466,852 offers a disposable saddle pad, with a lamellar structure, comprising a plastic liquid-tight film linked with one or two embossed paper sheets, one of them being intended to be in contact with the animal. However, this saddle pad is not satisfactory for the following reasons:

most often, the absorbent power of such pads is insufficient;

goffered paper sheets impregnated with perspiration have a tendency to deteriorate;

finally, such pads are not flexible enough, resulting in discomfort to the animal.

A multilayered saddle pad had been previously described in the U.S. Pat. No. 604,567 (Mc Clain). Beginning from the surface in contact with the animal, this pad was made out of:

an exterior smooth layer;

an absorbent layer made out of sponge;

a waterproof layer;

a classic fabric layer for a saddle pad;

an exterior smooth layer.

In U.S. Pat. No. 4,965,496 therein described absorbent multilayered articled protecting skin, which, beginning from the surface in contact with a person's skin or with the back of a horse or with the back of another animal, made out of:

a first layer made out of hydrophobic fibers which attract and store moisture and perspiration onto the interior side of the layer;

a semi-permeable membrane allowing moist and perspiration passage only from the hydrophobic fibers layer to the next layer;

this next layer being made out of a foam capable of absorbing water and cushioning shocks; and a possible liquid-tight layer.

However, this absorbent multilayered article is complicated and rather expensive, and because of the expense it may not be reasonable to dispose after one or several uses.

This is why the main object of the present invention is to eliminate the aforementioned drawbacks through providing articles absorbing perspiration which protect both the animal and saddle leather, these articles having therefore to store absorbed perspiration, even under pressure or under any distortion in normal use conditions.

Another important object of the present invention is also to provide articles absorbing perspiration at the lowest cost, low enough for them to be thrown away after one or several uses, in order to remove the necessity of maintenance obligation as well as infectious risks among animals and to insure better hygiene.

To reach these goals, the present invention proposes disposable articles for absorbing animal perspiration, comprising:

SUMMARY OF THE INVENTION an absorbent layer with a minimum absorption capacity of 150 g/m2 of perspiration (under pressure caused by a rider weight or without pressure) and are composed of:

(i) one or serval materials of different natures designed under the term "superabsorbent" (hydrostoring) and of at least one non-woven fabric and/or at least one fibrous pad, preferably fibers able to absorb perspiration, for instance cellulose or viscose fibers, this non-woven fabric and this fibrous pad allowing liquid diffusion; or (ii) a layer of at least 1 mm in thickness and with a weight of at least 90 g/m2 made out of fibers able to absorb perspiration and able to allow liquid diffusion, preferably cellulose or viscose fibers, these perspiration absorbent fibers being at least partly tied one with another, preferably thermally, through synthetic and thermo-fusible fibers, for instance polyethylene fibers or polypropylene fibers, or more preferably a mixture of these two types of fibers.

and at least one reinforcing layer to insure articles strength during use, this reinforcing layer being possibly composed of a film or of a non-woven layer or of a liquid-tight layer.

The disposable absorbent articles of the present invention are used preferably in such a way that the absorbent layer is in contact with the animal and that the reinforcing layer is inserted between the absorbent layer and the saddle leather. Such an arrangement for the disposable absorbent articles of the present invention is imperative when the reinforcing layer is made out of a liquid-tight layer.

One of the essential components of the disposable absorbent articles of the present invention is the absorbent layer. Advantageously, the absorption capacity of this layer is of about 500 g/m2 of the absorbent or superior layer.

In accordance with a first method of executing this invention, the absorbent layer is made out of one or several superabsorbents of different nature (hydrostoring) and of at least one non-woven fabric and/or of at least one fibrous pad, preferably fibers able to absorb perspiration, for instance cellulose or viscose fibers, this non-woven fabric and the fibrous pad allowing liquid diffusion.

Superabsorbents are understood generally as components made out of hydrophile polymer chains having generally ionic charges or out of plant fibers which, submerged in water, swell and turn into gel consistency. Thus, superabsorbents turn large quantities of liquid, such as about 10 or 30 times their volume, into gel, in a relatively short time, such as a few minutes. Gels obtained in this way can be treated to excrete the absorbed liquid by pressure or by distortion. As examples of well-known superabsorbents which can be used in the scope of the present invention, one can mention synthetic polymers and copolymers obtained from vinylic or acrylic monomers, such as acrylates, methacrylates, acrylamide, vinylpyrrolidone, etc.; natural products such as alginates or carrageenans; plant fibers such as sphaignes or agar agar; and products stemming from chemical modification of cellulose and starch, such as reticulated carboxymethylcelluloses and acrylic grafted starches. Superabsorbent articles obtained by chemical modification (alkaline hydrolysis or acid, sulphonation) or by physical (thermic or mechanic) modification of acrylic or styrenic polymers may be suitable as well.

In the scope of this first method to execute the invention, quantity of superabsorbents is preferably at least equal to 1 g/m2 of the disposable article.

The weight of superabsorbents by surface unity of the disposable and absorbent article is preferably at least equal to 2 g/m2, and more preferably does not exceed 12 g/m2. Even more particularly, its weight is around 3 or 4 g/m2.

In accordance with the first method to execute the present invention, superabsorbents are associated with at least one non-woven fabric and/or at least one fibrous pad, preferably fibers able to absorb perspiration.

In accordance with a first variation of this method to execute the invention, the non-woven fabric(s) and/or the fibrous pad(s) is:

distributed on a layer made of superabsorbents, and fixed, at least partly, to this layer of superabsorbents, for instance by thermo-binding or sticking.

Consequently, superabsorbents are inserted between the reinforcing layer and the non-woven fabric/s and/or the fibrous pad/s.

In such a case, superabsorbents may take any form, such as films, particles, or powder, possibly combined to a natural or synthetic particular material, for example polypropylene fibers, ground plant fragments, synthetic materials cut into pieces, viscose or defibered paper pulp.

Accordingly to a preferred alternative of the first method to execute the invention, the superabsorbent(s) is (are) physically mixed with at least one non-woven fabric and/or to a fibrous pad, this non-woven fabric and this fibrous pad allowing diffusion of liquids such as perspiration. Preferably, the non-woven fabric and the fibrous pad also are able to absorb perspiration. In other words, superabsorbent(s) is (are) distributed into at least one non-woven fabric and/or into one fibrous pad, this arrangement allowing liquid diffusion such as perspiration. It is also recommended that the fibrous pad or the non-woven fabric also is made out of anallergic material. For this purpose, one chooses preferably:

a fibrous pad absorbing perspiration and allowing liquid diffusion, preferably cellulose and/or viscose fibers (such as cellulose cotton wool sheets), moreover comprising fibers tied, at least partly, one with another, preferably thermo-fusible and thermally bonded fibers, these fibers being preferably polyethylene fibers and/or polypropylene fibers. Satisfactory results have been reached with fibrous pads absorbing perspiration and allowing liquid diffusion and having resistance to stretching of the order of 9N/50 mm or higher according to the EDANA standard.

or at least one non-woven fabric allowing liquid diffusion, preferably polypropylene and/or viscose material.

or even a fibrous pad absorbing perspiration and allowing liquid diffusion, preferably cellulose and/or viscose fibers (such as cellulose cotton wool sheets), moreover comprising fibers at least partly tied one with another, preferably thermo-fusible and thermally tied fibers, these fibers being preferably polyethylene and/or polypropylene fibers, and this pad being combined with one non-woven fabric which allows liquid diffusion, preferably polypropylene and/or viscose.

Under these conditions, insertion of the superabsorbent may be achieved for instance by setting it between cellulose cotton wool sheets or by laminating superabsorbent particles to the cellulose cotton wool sheet or by mixing superabsorbent with fibers (viscose fibers for instance), or even by mixing it with fibers (viscose or cellulose fibers for instance) and by distributing this mixture between cellulose cotton wool sheets. Preferably superabsorbent(s) is (are) allowed into the one third upper part of the absorbent layer and is (are) far from the surface in contact with the animal.

According to the chemical nature of material used to form the fibrous pad or the non-woven fabric, and according to its structure, the weight of this pad or fabric, per unit of surface of disposable absorbent article, may vary largely. Since, if the absorbent layer in which superabsorbent(s) has (have) been distributed is made out of a fibrous pad, tied one with another, preferably by thermal means, these fibres being polyethylene fibres and/or polypropylene fibres, this pad including also cellulose fibres, its weight is a minimum of 80 g/m2 of the article, preferably at least equal to 90 g/m2. This fibrous pad weight may reach 150 g/m2, and may even be higher. On the other hand, if the absorbent layer in which superabsorbent(s) has (have) been distributed is a non-woven fabric, the minimum weight of the non-woven fabric allowed is 30 g/m2 of the article. Its weight is preferably at least equal to 50 g/m2. This non-woven fabric weight may reach 75 g/m2 of the disposable and absorbent article, and may even be higher.

When distributed into at least a non-woven fabric and/or a fibrous pad, the superabsorbent preferably takes the shape of particles which sizes are advantageously comprised between 225 and 500 microns.

According to another method to execute the present invention, the absorbent layer is made of a layer which thickness is at least equal to 1 mm and which weight is at least equal to 90 g/m2 and is made out of fibers absorbing perspiration, preferably cellulose or viscose fibers, these fibers absorbing perspiration being tied one with another, partly at least. Preferably, these fibers are fibers thermally bonded by synthetic thermo-fusible fibers, such as polyethylene or polypropylene fibers, or even preferably a mixture of these two types of fibers. Moreover, this absorbent layer or fibrous pad must allow liquid diffusion.

Advantageously, the absorbent layer according to this second method of execution fulfulls one or several of the following characteristics:

(a) the thickness of the absorbent layer is preferably higher than 1.4 mm, more preferably around 1.5–2 mm, even higher.

(b) the weight of the absorbent layer is preferably around 150 g/m2, even higher. Preferably, this weight does not exceed 200 g/m2

(c) the absorbent layer includes one or several superabsorbents. Quantity of superabsorbents may be, in this case, lower than 1 g/m2.

(d) the superabsorbent(s) may be uniformly distributed into the pad or allowed in the middle of the pad. They are preferably allowed into the one third upper part of the pad and far from the surface in contact with the animal.

(e) the absorbent layer is preferably made out of at least two fibrous layers superposed and tied to each other, even preferably around 3–4 fibrous layers tied to each other.

(f) onto the external side of the absorbent layer, allowed to be in contact with the animal, is allowed a permeable liquid film, made out of synthetic thermo-fusible fibers, preferably polyethylene fibers. The essential function of this film, which is thermally tied to the absorbent layer, is to improve is resistance to chafing.

(g) the resistance to stretching of the absorbent layer is about 9N/50 mm or higher, according to the EDANA standard.

Satisfactory results have been reached with a saddle pad that fulfills all characteristics (a), (b), (e), (f) and (g) and which also includes a waterproof film of 19 g/m2 in polyethylene, laminated onto the absorbent layer.

Another essential characteristic of the present invention lies in the presence of a reinforcing layer in order to insure articles strength during use, particularly to increase disposable and absorbing articles resistance to friction and, so, avoid their tearing during normal use. Preferably, the reinforcing layer is made out of a liquid-tight layer in order to separate animal perspiration from saddle leather.

The precise chemical nature of the liquid-tight layer is not critical, subject to the fact that it leads to an external liquid-tight layer such as perspiration and to the fact that this layer keeps its liquid-tightness during normal use. So, this layer may be made of a tight thermo-plastic material such as natural or synthetic rubber or such an continuous film made of thermo-plastic material such as polyethylene or polypropylene material. This liquid-tight layer may take the shape of one or several superposed sheets made of thermo-plastic material, at least partly tied to each other. The liquid-tight layer may also be made of:

a non-woven proofed fabric such as a non-woven and laminated fabric composed of a non-woven fabric in polypropylene onto which polyethylene has been laid, advantageously at the rate of at least 15 g/m2 in polyethylene.

or of microperforated thermo-plastic material film, such as polyethylene or polypropylene material, this microperforated film being liquid-tight to aqueous liquids such as perspiration, thanks to its hydrophobic characteristic, but also being permeable to gas in order to favour the animal's covered parts to ventilate.

Concerning this aspect, for the tight layer to resist normal use restraints (such as chafing, stretching, and so on . . . ), without any noticed loss of its tightness characteristics, this layer must have sufficient mechanical tensile and friction strengths (breaking load), preferably around 14.1 N/inch (5.5 N/cm) or higher in machine direction and around 9.7 N/inch (3.8 N/cm) or higher in transverse direction, according to the ASTM D.882. standard.

According to the chemical standard of the external liquid-tight layer, and to its structure, the minimum weight of this layer, allowed per surface unit of the disposable and absorbent article, in order to guarantee a good liquid-tightness, may vary in large limits.

For example, if this tight layer takes the shape of a polyethylene sheet, it is preferable to allow a minimum weight of 15 g/m2 of the article, preferably comprised between 18 and 40 g/m2 of the article. Preferably, the tight layer has a cloth appearance or, in any case, is made out of unpolished and non slippery polyethylene.

According to an advantageous alternative of the invention, a non-woven or woven fabric, which may be shaped (for instance goffered) is fixed onto the external tight layer.

According to another advantageous alternative, the external layer of the disposable and absorbent articles according to the invention, which is made out, depending on the case, of the reinforcing layer itself or, as said before, of a non-woven or woven fabric, is:

white or colourful, and/or plain or printed coloured, and/or given a personal touch by words and/or drawings printing, for instance on advertising purpose, and/or wholly or partly coated with a thin layer of a self adhesive substance which allows repeated unsticking, this in order to avoid the disposable and absorbing article to slide, etc.

This fabric, woven or non-woven, is preferably polyethylene or viscose. More preferably, the minimum weight of this fabric per surface unit of the disposable and absorbent articles is of 17 g/m2 and, even better, does not exceed 26 g/m2.

Advantageously, a non-woven additional fabric may be allowed onto the absorbent layer in order to increase cohesion and mechanical characteristics of the whole that forms the disposable and absorbent article according to the invention. As this non-woven fabric is intended to be in contact with the animal, a non-woven fabric is chosen in order to let perspiration through and to be able to resist normal use restraints particularly such as chafing (friction) on the animal coat.

As examples of materials suitable to the manufacture of this non-woven fabric, polypropylene or viscose or polyethylene fibers can be mentioned, this last being obtained by spraying continuous polyethylene fibers. In order to avoid skin allergy problems, natural viscose or cotton fibers are preferably used.

Advantageously, the disposable and absorbent articles according to the present invention may also be used as support for some medicinal products for veterinary use which will be able to diffuse favourably, thanks to animal back heat, will then penetrate the skin and have a therapeutic effect. Synthetic or phytotherapic products may be used in this purpose. To this aim, one will impregnate:

the absorbent layer, preferably the closest part of this layer in contact with the animal skin;

or, even better, the non-woven fabric if there is one, allowed onto the absorbent layer.

A muscles relaxant (in the form of a gel), an anti-inflammatory agent, an analgesic agent, and agent favouring blood circulation, . . . may be mentioned as examples of medicine for skin penetration which can be associated to disposable and absorbent articles according to the present invention. These medicine may also be associated to disposable and absorbent articles by impregnation or spraying powdery articles, lyophilised or liquids or micro capsules or any other Galenic form.

According to their purpose, disposable and absorbent articles according to the present invention may take very various forms. Thus, to be used as saddle pads, they may take a rectangular shape or a saddle shape or any other shapes between these two aforementioned shapes.

They may also be presented as already distinctive packed articles or as pre-cut rolled articles.

Disposable and absorbent articles according to the present invention may be prepared as follow:

the absorbent layer described as above, in which, depending on the case, is incorporated one or several superabsorbents, is set against the external reinforcing layer, detailed as above, and the perimeter of the edges is sealed by sticking or thermally tied in order to avoid liquid leakage and to give good cohesion to the article.

The invention is of course understood as being not limited by the methods of execution described as above, to which other alternatives are allowed without coming out of the scope of the appended claims.

What is claimed is:

1. Disposable horse or pony blanket for absorbing horse or pony perspiration, the blanket comprising:
    a) a flat absorbent layer comprised of at least one superabsorbent and at least one material selected from a group consisting of non-woven fabric and at least one pad of fibers; and
    b) at least a pair of gas-permeable reinforcing layers respectively bound to each side of the flat absorbent layer and comprised of a material selected from a group consisting of a microperforated film and a non-woven fabric,
    wherein the non-woven fabric or the at least one pad of fibers of the flat absorbent layer is constructed so as to be capable of absorbing perspiration and capable of allowing diffusion of said perspiration,
    and wherein the flat absorbent layer has an absorption capacity of at least 150 g of perspiration per $m^2$ of said flat absorbent layer and said flat absorbent area is present in substantially the entire area of the blanket,
    and wherein said disposable blanket is devoid of any layers which are not gas-permeable.

2. A disposable blanket according to claim 1, wherein the minimal absorption capacity of the flat absorbent layer is around 500 g/m2.

3. A disposable blanket according to claim 1, wherein the flat absorbent layer is comprised of non-woven fabric and wherein the at least one superabsorbent comprises a layer, and wherein the non-woven fabric of the flat absorbent layer is at least partly fixed to said layer of at least one superabsorbent.

4. A disposable blanket according to claim 1, wherein the at least one superabsorbent is physically combined with at least one non-woven fabric or pad of fibers of the flat absorbent layer.

5. A disposable blanket according to claim 3, wherein the absorbent layer in which the at least one superabsorbent has been distributed is comprised of a non-woven fabric, and the minimum weight of the non-woven fabric is 30 g/m2 of the disposable blanket.

6. A disposable blanket according to claim 3, wherein the non-woven fabric of the flat absorbent layer is made of at least one material selected from the group consisting of polypropylene and viscose.

7. A disposable blanket according to claim 1, wherein the at least one superabsorbent comprises a layer, and wherein the flat absorbent layer is comprised of at least one pad of fibers, and wherein the at least one pad of fibers is at least partly fixed to said layer of at least one superabsorbent.

8. A disposable blanket according to claim 1, wherein the at least one pad of fibers is comprised of cellulose and viscose fibers, and thermally bonded fibers, said thermally bonded fibers being thylene and polypropylene fibers, said pad of fibers having a minimum weight of 80 g/m2 of the disposable blanket.

9. A disposable blanket according to claim 1:
    wherein the at least one pad of fibers is comprised of cellulosic fibers, and at least one of polyethylene and polypropylene thermoplastic fibers, wherein the thermoplastic fibers are at least partially bonded with one another; and
    wherein at least a pair of reinforcing layers are comprised of non-woven fabric of polypropylene fibers.

10. A method of protecting a horse or pony, comprising applying a disposable blanket according to claim 9 in direct contact with the back of said horse or pony.

11. A disposable blanket according to claim 1, wherein the at least one superabsorbent is in the shape of particles and wherein said particles have dimensions between 225 microns and 500 microns.

12. A disposable blanket according to claim 1, wherein the at least one superabsorbent is either uniformly distributed into the flat absorbent layer or is located in the middle of the absorbent layer.

13. A disposable blanket according to claim 1, wherein the at least one superabsorbent is located in the upper one third part of the flat absorbent layer and located away from the surface in contact with the animal.

14. A disposable blanket according to claim 1, wherein the flat absorbent layer is comprised of at least two superposed fibrous layers which are tied to each other.

15. A disposable blanket according to claim 1, wherein at least one reinforceable layer is comprised of synthetic thermo-fusible fibers.

16. A disposable blanket according to claim 1, wherein at least one reinforceable layer is white, colorful, plain, printed colored, or has printed words or drawings.

17. A disposable blanket according to claim 1, wherein at least one reinforcing layer is a non-woven fabric.

18. A disposable blanket according to claim 1, wherein at least one reinforcing layer is non-woven thermo-bonded polypropylene.

19. A disposable blanket according to claim 1, wherein at least one reinforceable layer is wholly or partly coated with a thin layer of a self adhesive substance which is capable of preventing the disposable blanket from sliding when the disposable blanket is in contact with a saddle, and is capable of allowing the disposable blanket to be separated from the reinforcing layer.

20. A disposable blanket according to claim 1, wherein the reinforcing layers are comprised of a microperforated film.

21. A disposable blanket according to claim 1, wherein the reinforcing layers are comprised of a non-woven fabric.

22. A method of absorbing perspiration from a horse or pony, comprising applying the disposable blanket of claim 1 to the back of a horse or pony before a saddle may be placed on the disposable blanket.

23. A method according to claim 22, wherein at least one reinforcing layer is a non-woven thermo-bonded polypropylene.

24. A method of protecting a horse or pony, comprising applying the disposable blanket of claim 1 to the back of a horse or pony.

25. A method according to claim 24, wherein at least one reinforcing layer is a non-woven thermo-bonded polypropylene.

26. A method according to claim 24, wherein at least one reinforcing layer is a non-woven fabric layer.

27. A Disposable horse or pony sheath, for a strap or harnessing component, for absorbing horse or pony perspiration, the sheath comprising:
   a) a flat absorbent layer comprised of at least one superabsorbent and at least one material selected from a group consisting of non-woven fabric and at least one pad of fibers, and
   b) at least a pair of gas-permeable reinforcing layer respectively bound to each side of the flat absorbent layer and comprised of a material selected from a group consisting of a microperforated film and a non-woven fabric,
   wherein the non-woven fabric or the at least one pad of fibers of the flat absorbent
   layer is constructed so as to be capable of absorbing perspiration and capable of allowing diffusion of said perspiration, and wherein the flat absorbent layer has an absorption capacity of at least 150 g of perspiration per m$^2$ of said flat absorbent layer and said flat absorbent layer is present in substantially the entire area of the blanket.
   and wherein said disposable blanket is devoid of any layers which are not gas-permeable.

28. A disposable horse or pony blanket for absorbing horse or pony perspiration, the blanket comprising:
   a) a flat absorbent layer comprised of at least one superabsorbent and at least one material selected from a group consisting of non-woven fabric and at least one pad of fibers; and
   b) at least one reinforcing layer bound to at least one side of the flat absorbent layer,
   wherein the non-woven fabric or the at least one pad of fibers of the flat absorbent layer is constructed so as to be capable of absorbing perspiration and capable of allowing diffusion of said perspiration,
   and wherein the flat absorbent layer is present in substantially the entire area of the blanket,
   and wherein said disposable blanket is devoid of any layers which are not gas-permeable.

29. A method of protecting a horse or pony, comprising applying the disposable blanket of claim 28 to the back of a horse or pony.

30. A method of absorbing perspiration form a horse or pony, comprising applying the disposable blanket of claim 28 to the back of a horse or pony, and placing a saddle on the blanket.

31. A disposable horse or pony blanket for absorbing horse or pony perspiration, the blanket comprising:
   a) a flat absorbent layer comprised of at least one superabsorbent and at least one non-woven fabric or at least one pad of fibers; and
   b) at least a pair of reinforcing layers respectively bound to each side of the flat absorbent layer,
   wherein the non-woven fabric or at least one pad of fiber of the flat absorbent layer is constructed so as to be capable of absorbing perspiration and capable of allowing diffusion of said perspiration,
   and wherein said disposable blanket is devoid of any layers which are not gas-permeable.

32. A method of protecting a horse or pony, comprising applying the disposable blanket of claim 31 to the back of a horse or pony.

33. A method of absorbing perspiration from a horse or pony, comprising applying the disposable blanket of claim 31 to the back of a horse or pony, and placing a saddle on the disposable blanket.

34. Disposable horse or pony blanket for absorbing horse or pony perspiration, the blanket comprising:
   a) a flat absorbent layer comprised of at least one superabsorbent and at least one material selected from a group consisting of non-woven fabric and at least one pad of fibers; and
   b) at least a pair of gas-permeable reinforcing layers respectively bound to each side of the flat absorbent layer and comprised of a material selected from a group consisting of a microperforated film and a non-woven fabric,
   wherein the non-woven fabric or the at least one pad of fibers of the flat absorbent layer is constructed so as to be capable of absorbing perspiration and capable of allowing diffusion of said perspiration,
   and wherein the flat absorbent layer has an absorption capacity of at least 150 g of perspiration per m$^2$ of said flat absorbent layer and said flat absorbent area is present in substantially the entire area of the blanket.

35. A disposable blanket according to claim 1, wherein the flat absorbent layer is comprised of a non-woven fabric.

36. A disposable blanket according to claim 1, wherein the flat absorbent layer is comprised of at least one pad of fibers.

* * * * *